Dec. 26, 1967

J. K. PHARES 3,360,653

PHOTOELECTRIC DOCUMENT AUTHENTICATING
APPARATUS WITH AGE AND COLOR
COMPENSATION

Filed Oct. 22, 1964

INVENTOR.
JAMES K. PHARES
BY Oldham & Oldham

ATTYS.

United States Patent Office
3,360,653
Patented Dec. 26, 1967

3,360,653
PHOTOELECTRIC DOCUMENT AUTHENTICATING APPARATUS WITH AGE AND COLOR COMPENSATION
James K. Phares, Akron, Ohio, assignor to Transmarine Corporation, Chesterland, Ohio, a corporation of Ohio
Filed Oct. 22, 1964, Ser. No. 405,666
11 Claims. (Cl. 250—219)

ABSTRACT OF THE DISCLOSURE

Apparatus for authentication of paper documents or the like which utilizes a reference photocell to set a reference voltage level for the amount of light passage through the document to thereby set for the authentication of each document a relationship between the light source and a plurality of test photocells whereby the age, color, and condition of the document is determined by the reference voltage. The output voltages from the test photocells are then sent to a zener diode circuit where the zener diodes are arranged to provide a voltage pass band for authentication. As long as the output voltages from the test photocells do not fall outside the voltage pass band, the zener diore circuit will not cascade, and this indicates an accept, or a properly authentic document.

---

This invention relates to an apparatus for authentication of documents in the performance of vending functions, and more particularly, to an apparatus for receiving and identifying as genuine a piece of paper money, which may be followed by the performance of a vending function.

This application represents an improvement in the electrical circuit design of U.S. Letters Patent No. 3,211,268, granted Oct. 12, 1965, for which I am a co-inventor, and which is assigned to the same assignee. Thus, it should be understood that the circuitry presented hereinafter is primarily designed to improve the circuit combination set forth in the above-identified patent application.

Therefore, it is the general object of the present invention to simplify the circuitry set forth in the above-identified patent application, and to provide a simplified circuitry for a paper money authentication system, which system automatically, quickly, and extremely accurately determines the authenticity of paper money to provide accept signals to other apparatus to perform a vending function.

It is another object of this invention to provide an apparatus and circuitry for identifying paper money that automatically compensates for variations in the age and color of the money, and that is adjustable for different kinds of paper money or paper securities.

Another object of the invention is to provide an accurate circuitry to determine the authenticity of paper money, which circuitry operates between predetermined selected levels of authenticity and provides an accept output control signal if the paper money tests within the predetermined selected levels.

The aforesaid and other objects of the invention are achieved by providing in a circuit for authenticating paper money the combination of a reference photocell to view a particular area of a paper security to be tested, circuit means connected to the reference photocell to produce an output voltage dependent upon the amount of light detected by the reference photocell, a plurality of test photocells operatively supplied with the output voltage from the circuit means to view other areas of the paper security to be tested, a separate second circuit means operatively associated with each test photocell comprising a pair of zener diode circuits, each having one end connected in common to the voltage potential determined by the test photocell and one circuit having its other end connected to a constant input voltage to the circuit and the other circuit having its other end connected to ground, said zener diode circuits being oppositely directed to pass current only when the voltage potential thereacross exceeds a predetermined value so that an accept test is present when neither zener diode circuit conducts current, and means to sense all the zener diode circuits associated with all the test photocells to determine whether paper security tested is authentic.

For a better understanding of the invention reference should now be had to the accompanying drawings, wherein.

Figure 1:
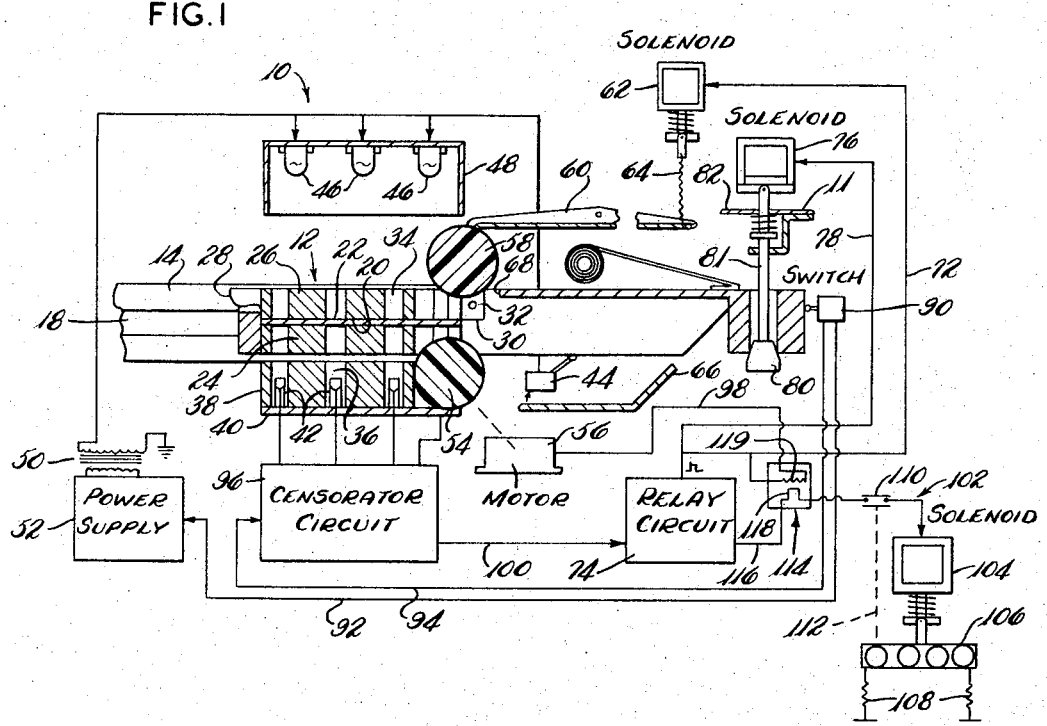
FIGURE 1 is a diagrammatic view partly in section showing the apparatus and control circuits of the invention.

The term "paper money" has been largely used heretofore in reference to the article or articles to be identified by the testing apparatus of this invention, but this term is intended to include paper currency of all sizes, denominations, and countries of origin, in addition to bonds, documents, other paper, textile, or colored articles which might be subject to test for genuineness, weave, composition, color, pattern, or the like, by equipment of the character hereinafter described and claimed. However, the apparatus of the invention is primarily designed for the determination of genuineness of United States paper money in lower denominations. For example, one dollar, five dollar, and ten dollar bills. In order to shorten the designation of the article being tested, as called for hereinafter, it will be designated in the drawings as a bill and will be so described in the specification.

With reference to the form of the invention illustrated in FIGURE 1 of the drawings, the numeral 10 indicates a bill changing apparatus supported by a packaging frame 11 only a portion of which is indicated in the drawing. A substantially horizontal guide rail 14, secured to the frame 11, guides a bill slide 12 to an in and out position. To provide clearance for the movable bill slide 12, the dimension of the slide in the direction normal to its movement is slightly less than the height of the guide rail 14. The guide rail 14 is formed with a longitudinally extending groove 18. The slide 12 contains a bill chamber 20 adapted to receive a bill 22. The bill chamber is formed by a bill support plate 24 and a bill cover 26 which has an outwardly extending lip 28 that serves as a handle for the operator. The cover plate 26 has a forwardly extending ear 30 which receives a pivot pin 32 to mount the cover plate 26 on the slide 12. When the cover plate 26 is opened, the lower surface of the ear 30 functions to position the bill 22 accurately in the bill chamber 20.

The support and cover plates have a plurality of spaced concentric bores 34 which extend through the plates in a direction normal to the movement of the slide. The plates contain at least one bore in each corner portion thereof which are utilized to provide a first test on the size of the bill, as more fully set out hereinafter. The large number of the bores 34 provides the apparatus with inherent versatility since a large number of different portions of the bill can be comparatively tested to determine the authenticity thereof.

As shown in FIGURE 1, the slide 12 is in the "in" position. In this position, the bores 34 are in alignment with matching bores 36 in a plate 38. The plate 38 is secured to and spans the lower portion of the guide rail 14. A circuit board 40 positions a selected number of light sensitive photocells 42, such as photodiodes or photoresistors, in the bores 36. As explained above, the circuit board 40 positions at least one cell in each corner bore and six cells in selected bores over the surface of the bill. The number of cells, the electrical characteristics of the separate cells, and their relative locations can be varied in accordance with the unique requirements of the document being tested.

Movement of the slide 12 to the "in" position trips a microswitch 44 to apply power to a plurality of lamps 46 supported in a housing 48, while at the same time supplying power to a transformer 50 of a power supply 52. The housing 48 is positioned above the slide and in alignment with the bores of the plate 38. The light energy from the lamps 46 passes through the bill 22 in the bill chamber 20 and then strikes the light sensitive photocells 42. The resulting electrical characteristics of the individual cells is a function of the intensity and color of the light thereon.

In order to remove the bill 22 from the bill chamber 20, a roller 54 driven by a motor 56 is journalled on the frame so that the upper portion of the roller extends slightly below the leading portion of the bill 22. An idler roller 58 journalled on a lever 60 pivoted to the frame is positioned above the leading edge of the bill slightly forward of the axis of the roller 54. A solenoid 62 connected to the free end of the lever 60 by a spring 64 moves the idler roller 58 into engagement with the leading or forward edges of the bill to pinch the bill between the rollers 54 and 58. The application of torque to the roller 54 by the motor 56 pulls the bill 22 from the bill chamber 20 into a bill chamber 66. The solenoid 62 is actuated through a line 72 from a relay circuit 74 and reciprocates the lever 60 to move the idler roller 58 into and out of an opening 68 in the bill slide 12.

In a similar manner a solenoid 76, controllable by a signal from a relay circuit 74 over a line 78, is adapted to position a plunger 80 slidably supported in the frame 11 to lock the slide 12 in the "in" position. An extensible flat coil spring 82, having one end thereof secured to the slide 12 and the coil portion thereof secured to the frame 11 functions to return the slide to the "out" position.

The control circuit power supply 52 is conductively connected to a switch 90 by means of a conductor 92. The switch 90 is operated by movement of the bill slide 12 to the "in" position. Conductor means 94 connect the switch 90 with a censorator circuit 96. The censorator circuit 96 is connected to the light sensitive cells 42 and to the relay circuit 74 which is electrically coupled to the motor 56 by a conductor 98. When a bill has been properly removed from the bill chamber, the censorator circuit 96 sends a payout signal through a conductor 100 to the relay circuit 74. The payout signal energizes one of the relays in the circuit 74 to supply a power payout signal to a coin vending mechanism, indicated generally by the numeral 102, and more specifically to a payout solenoid 104 associated therewith.

The coin vending mechanism 102 contains a coin ejection knife 106 which is moved in operative position by the solenoid 104 against the force of a pair of tension springs 108. Upon de-energization of the solenoid 104, the springs 108 function to eject the coins in front of the leading edge of the knife 106 to a vending trough accessible to the operator (not shown).

In order to de-energize the solenoid and reset the relays in the relay circuit 74 upon actuation of the payout signal, a normally closed switch 110 may be opened by a linkage 112 when the solenoid is fully energized to thus effect the de-energization.

A thermal overload switch 114 may be positioned in the conductor to coin solenoid circuit conductor 116 to break the circuit to the solenoid when the energization to the motor 56 exceeds a predetermined time. The switch contains a pair of bimetal contacts 118, and a heater 119 associated with the drive circuit to the motor 56, all in the conventional manner for a thermal overload switch.

*Operation of censorator circuit*

Figure 2:
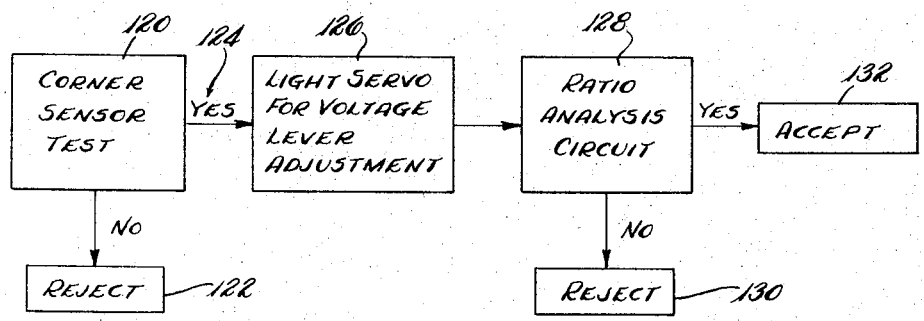
FIGURE 2 is a block diagram of the essential components in the censorator circuit of FIGURE 1.

FIGURE 2 illustrates in block diagram the circuits and functions carried out by the censorator circuit 96. First, a corner sensor test, as indicated by block 120 is conducted to test the corners of a bill placed for validation, to be sure that all corners are in place and of the proper consistency. A no signal might actuate a reject 122 if the corners do not meet the test, whereas if the corners are satisfactory, a yes signal 124 will be sent to the next sequential step which is a light servo circuit to obtain a voltage level adjustment, as indicated by block 126. A satisfactory voltage level adjustment signal is sent to a ratio analysis circuit 128 where the final test validation of the bill is generally made at random by some of the randomly located bores 34 and 36, as shown in FIGURE 1 and set forth above. The output from this circuit 128 will provide either a no signal for a reject function 130 or a yes signal for an accept function 132.

The features of the corner sensor test 120 are essentially conventional and merely measure the amount of light passed through the corner portions of the bill to simply determine that corner portions are present and that the bill is squarely and properly placed in the slide 12.

Figure 3:
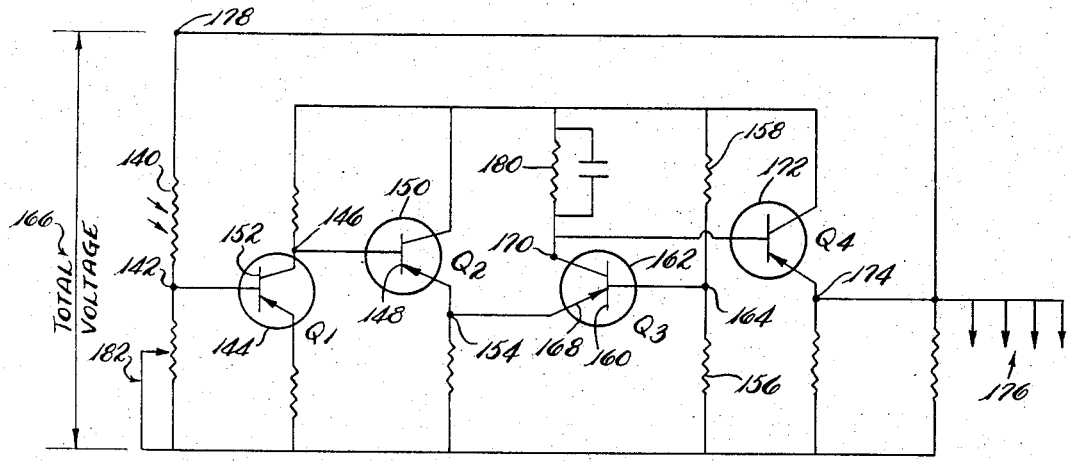
FIGURE 3 is a schematic circuit diagram of the light servo system shown in the block diagram of FIGURE 2.

For a better understanding of the light servo and voltage adjustment section 126, reference should be had to FIGURE 3 wherein the numeral 140 indicates a reference photocell which is positioned under the light source 66, as seen in FIGURE 1, so that it sees a fairly clear portion of the bill. It is the purpose of this reference photocell 140 to determine a reference level for all the other photocells viewing the bill to be tested. The light impinging upon the cell 140 establishes a voltage level or current level at a point 142. The voltage supplied to point 142 biases a transistor Q1 indicated by numeral 144 to establish a second reference voltage at a point 146, which is the collector of transistor Q1. The base 148 of a transistor Q2, indicated by numeral 150, is connected to point 146 so that it senses any voltage change caused by a change in light or change in voltage to the reference photocell 140. If, as an example, a decrease of light should occur or any change in voltage reference should occur this causes a lessening of the current or voltage at this point raised the voltage at point 146, and this rise in voltage would be detected by the base 148 of transistor 150 which controls the voltage at point 154, which comes from the emitter of transistor 150.

In order to utilize the voltage reference level, established as set forth above, at point 154, a pair of resistors 156 and 158 are provided as voltage dividers to establish a reference voltage level on the base 160 of a transistor 162. As the voltage at point 154 changes with respect to the voltage at a point 164, which is the same as the voltage on the base 160 of transistor 162, it will change with respect to a total voltage 166 initially impressed upon the circuit. This change will cause a lessening of the current through the base emitter 168 of transistor 162. A lessening of current would cause the potential at a point 170, representing the collector of transistor 162, to become more nearly the value of the total voltage 166.

The purpose of a transistor 172 is nothing more than to provide an isolation emitter follower circuit which will follow the voltage change at point 170, while isolating point 170. Thus, the voltage at a point 174 will actually be the same, except for the voltage drop across the transistor 172, as it will follow the voltage at point 170.

Now, point 172 is connected to all the remaining photocells through a plurality of connectors 176, and is also tied back to a point 178 which is the voltage reference point for the reference photocell 140. Thus, it should be obvious that as the voltage at point 178 increases due to a decrease in the original light source impinging upon the reference cell 140, this will cause a current increase through transistor Q1 (144), and the remaining circuit will maintain the same current flow through transistor Q1 or the same voltage at point 146. This means that the current or voltage always follows a closed path to its origin to provide a stable reference circuit. In this manner the amount of light detected by the reference photocell 140, through this associated circuitry, controls the amount of voltage supply to all the other test photocells. The unique result of this setup occurs since all of this type of photocell are somewhat non-linear devices having similar curves so that any light impinging upon the reference photocell causes all the rest of the test photocells to assume the same point on their curves. Thus, the voltages supplied to the circuit will always be constant as determined by the voltage of the reference photocell 140. This servo circuit insures a constant source voltage for all the transistors and other photocells to insure uniformity, top performance, and accurate bill authentication, regardless of the age or condition of the bill tested.

A capacitor-resistor circuit 180 is provided to prevent possible oscillations from occurring. In a feedback circuit operated at higher frequencies, there is sometimes sufficient phase change that oscillations can occur. Thus, this circuit 180 insures that the roll up from the amplifier occurs before a 180° phase shift can occur to cause oscillations in the circuit. An adjustable resistor 182 establishes a bias level for the operation of all the remaining photoelectric cells as supplied by the conductors 176. This circuit 182 is adjusted by hand externally according to standard normal conditions by setting the reference somewhere between the maximum and the minimum servo capabilities of the circuit to provide a balanced condition, or balanced voltage at point 142. The other resistors in the circuit connected to the transistors act as normal biasing resistors or stabilization resistors to provide some feedback to further enhance stabilization of the circuitry.

Figure 4:
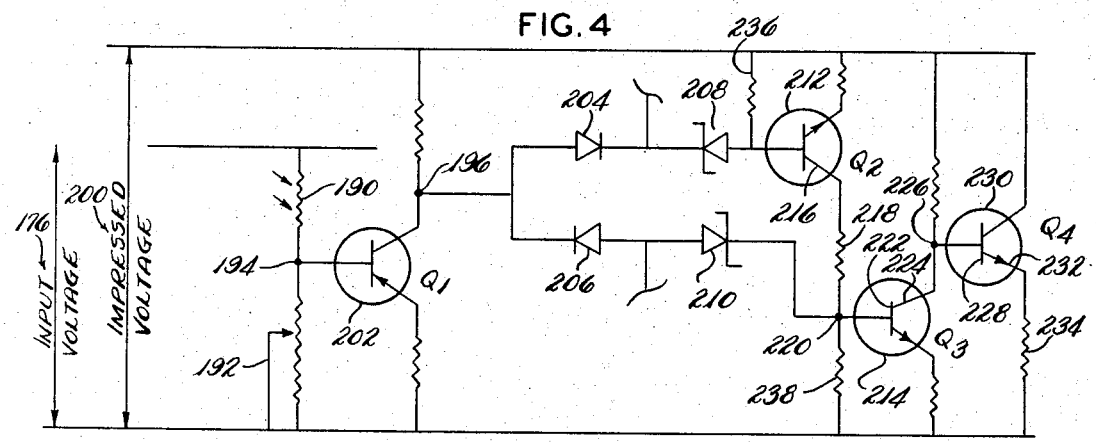
FIGURE 4 is a schematic circuit diagram of the ratio analysis circuit in the block diagram of FIGURE 2.

FIGURE 4 illustrates the individual circuit for any particular photocell receiving its stabilized reference voltage from the reference photocell circuitry of FIGURE 3. In this instance, the input voltage 176 is impressed across a test photocell 190. This photocell 190 will be located to look at any random light or dark spot on the bill under examination. Of course, as stated above, the input voltage 176 will be dependent upon the reference photocell 140 associated with the circuitry of FIGURE 3 and as the reference photocell changes it will simultaneously change the voltage level to this photocell 190 to the same level conditions. An adjustable resistor 192 may be provided to externally adjust voltage levels at points 194 and 196 to approximately the middle of what we will call the pass band or pass area of the detector. In other words, if the voltage 200 impressed across the remaining circuitry of FIGURE 4 would be in the vicinity of 20 volts, the voltage level adjustment at points 194 and 196 would be adjusted to the vicinity of 10 volts. It should be understood that point 196 is the collector resistor of a transistor 202 labeled Q1 which serves essentially the same purpose as the transistor 144 labeled Q1 in FIGURE 3.

Diodes 204 and 206 merely act as isolation diodes with one being reversed from the other. These diodes 204 and 206 feed into a pair of zener diodes 208 and 210 respectively, which likewise are in a reverse condition. The zener diode 208 cascades into an NPN transistor 212 labeled Q2, whereas zener diode 210 cascades into a PNP transistor 214 labeled Q3. The collector resistor 216 of transistor 212 passes through a resistor 218 and into a point 220 which is affixed to the base 222 of transistor 214, which point 220 also receives the output from zener diode 210. The collector resistor 224 of transistor 214 feeds to a point 226 which is connected to the base 228 of a transistor 230 labeled Q4. The emitter 232 of transistor 228 feeds into a relay load coil 234.

The essence of the operation of the circuit of FIGURE 4 resides in having the diodes 204 and 206 in opposite phase and the zener diodes 208 and 210 also in opposite phase with each connected by a respective resistor 236 and 238 to each side of the impressed voltage 200, so that in effect the diode group 204, 208 through 236 is dependent upon the top side or voltage potential of the impressed voltage 200 while the grouping 206, 210 through resistor 238 is dependent upon the bottom side or ground of the impressed voltage 200. Since both sides have one end tied in common to the initial voltage reference point at 196, the respective voltage potential of each zener diode circuit depends upon the voltage at reference point 196.

The zener diodes 208 and 210 have properties not to pass current until the voltage potential thereacross exceeds a certain threshold. They cascade current at this point. When the photocell 190 does see the proper authentication or the proper amount of light on the bill being tested, the voltage potentials across both zener diodes 208 and 210 will not be sufficient to allow them to cascade current so that there will be no current conduction by transistor 214 labeled Q3 into transistor 230 labeled Q4. However, when the voltage at point 196 does fluctuate from the approximate medium level, it may cause an overbalance or underbalance in the split diode set up so that the voltage potential across one of the zener diodes will exceed the threshold level causing it to cascade so that some current flow will occur through transistor 214, which in effect provides a reject signal.

The exact properties of the diodes 204 and 206, along with the zener diodes 208 and 210 will determine the threshold voltage levels which will provide accept signals. For example, with reference to FIGURE 4, if the impressed voltage 200 is 28 volts, the zener diode set up may be such that they will cascade when the voltage potential thereacross exceeds 16 volts. This means that the voltage at point 196 may fall between the areas of +12 and +16 volts, which will not actuate either zener diode, but if the voltage at point 196 falls above or below these levels one or the other of the zener diodes will rise above its voltage potential and cascade.

Figure 5:
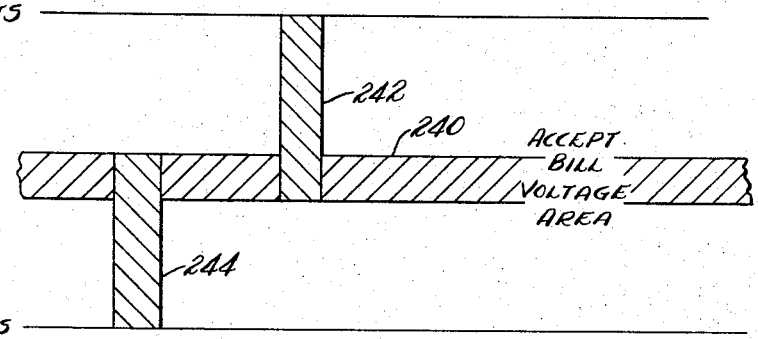
FIGURE 5 is a graphic illustration of the adjustable voltage level determined by the zener diodes within which signals from all test photocells must fall in order to provide accept reference levels.

It should be quite obvious, that any threshold voltage level could be provided by different properties in the zener diodes. With reference to FIGURE 5, the band of the accept bill voltage area, indicated by numeral 240 might be as broad or as narrow as desired in order to add more or less security to the authentication procedure. In FIGURE 5, the vertical downward voltage column 242 might properly represent the voltage reflected on the path containing the diode 204 and zener diode 208, whereas the upwardly directed voltage column 244 might properly represent the path containing the diode 206 and zener diode 210. FIGURE 5 shows a pass band between 12 and 16 volts, but this is dependent upon the cascading properties of the zener diodes 208 and 210.

Thus, it is seen that the objects of the invention have been achieved by providing a circuit which utilizes a reference photocell to establish voltage levels for all other authenticating test photocells in the circuit based on the physical properties of the exact bill being tested. Each particular test photocell, other than the reference cell, is preset for its particular area of view by a manually set variable rheostat so that it will provide a reference voltage within the accept voltage area, if it views an authentic bill. Each particular test photocell is connected to individual circuitry containing diodes and zener diodes in oppositely directed manner so as to provide an accept bill voltage area as determined by the area of the bill seen by its associated photocell. Each and every photocell in the circuit must provide an accept signal, or in other words not conduct through its Q3 transistor in order to provide a complete acceptance of the bill being authenticated. This simple circuitry provides authentication of any bill being tested in a positive manner and with any degree of security desired, as particularly selected by the accept bill voltage area determined by the diodes and zener diodes in combination. The accept signal from all test photocell circuits allows the censorator circuit 96 of FIGURE 1 to send an accept signal to the relay circuit 74 to effect performance of the vend function.

While this specification has only described the photocells as measuring light passed through the bill, it must be understood that the circuits described herein would function properly if the photocells measured only reflected light, or only reflected infra-red or ultraviolet light, from one or both sides, or a combination of any of these.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. In a circuit for authentication of paper securities the combination of
   means to project light onto a paper security to be tested,
   a reference photocell to view a particular area of the paper security to be tested,
   circuit means connected to the reference photocell to produce an output voltage dependent upon the amount of light detected by the reference photocell,
   a plurality of test photocells electrically connected with the output voltage from the circuit means to view other areas of the paper security to be tested,
   a separate second circuit means impressed with a constant input voltage electrically connected with each test photocell comprising
      a pair of zener diode circuits each having one end in common to the voltage potential determined by the test photocell and one circuit having its other end connected to the constant input voltage to the second circuit means and the other circuit having its other end connected to ground, said zener diode circuits being oppositely directed to pass current only when the voltage potential thereacross exceeds a predetermined value so that an accept test is present when neither zener diode circuit conducts current, and
      means to sense all the zener diode circuits electrically connected with all the test photocells to determine whether the paper security tested is authentic.

2. A circuit according to claim 1 where the circuit means connected to the reference photocell is a feedback circuit which thereby provides a constant check and balance on the reference voltage provided by the reference photocell, and which circuit also has a capacitor-resistor circuit connected thereto to prevent oscillations.

3. A circuit for authenticating paper money according to claim 1 where the zener diodes associated with the second circuit means will cascade at predetermined similar voltage potentials to define a selected pass band for a bill authentication.

4. A circuit for authenticating paper money according to claim 1 where the zener diodes associated with the second circuit means will cascade at predetermined dissimilar voltage potentials to define a selected pass band for a bill authentication.

5. In a circuit for authentication of paper securities the combination of
   reference means to view a particular area of a paper security to be tested,
   circuit means connected to the reference means to produce an output voltage dependent upon the condition of the paper security to be tested,
   a plurality of test means operatively supplied with the output voltage from the circuit means to view other areas of the paper security to be tested,
   a separate second circuit means having a constant input voltage impressed thereacross electrically connected with each test means comprising
      a pair of zener diode circuits each having one end in common to the voltage potential determined by the test means with one zener diode circuit having its other end connected to the constant input voltage to the second circuit means and the other zener diode circuit having its other end connected to ground, said zener diode circuits being oppositely directed to pass current only when the voltage potential thereacross exceeds a predetermined value so that an accept test is present when neither zener diode circuit conducts current, and
      means to sense all the zener diode circuits electrically connected with all the test means to determine whether the paper security tested is authenticated.

6. A circuit according to claim 5 where the circuit means connected to the reference means follows a closed path to its origin to provide a constant check and balance on the reference voltage provided by the reference means, and which circuit further utilizes a capacitor resistor circuit associated therewith to prevent oscillation.

7. In an electrical circuit for authentication of a paper security the combination of
   means to project light onto the security,
   a reference photocell to measure in a voltage the amount of light passed through a relatively clear portion of the security,
   a feedback circuit actuated by the voltage measurement from the reference photocell to establish a reference voltage level,
   a plurality of test photocells to measure in a voltage the amount of light passed through the bill at other randomly selected areas, said photocells being actuated by the reference voltage level established by the feedback circuit,
   a separate zener diode circuit having a constant voltage impressed thereacross being electrically connected with each respective test photocell, said zener diode circuit comprising
      a pair of zener diodes having determined voltage limits positioned in series in opposite phase across the constant voltage impressed on the circuit so that the voltage measured by the respective test photocell is impressed on the common point between the series connected zener diodes, and
      a load to receive currents transmitted by the zener diode circuit upon the cascaded unloading of one of the zener diodes when the voltage thereacross has exceeded the determined voltage limit.

8. A circuit according to claim 7 where the feedback circuit utilizes a capacitor resistor circuit associated therewith to prevent oscillations.

9. In an electrical circuit for authentication of a paper security the combination of
   means to project light onto the security,
   a reference photocell to measure in a voltage the amount the light reflected from a relatively clear portion of the security,
   a feedback circuit actuated by the voltage measurement from the reference photocell to establish a reference voltage level,
   a plurality of test photocells to measure in a voltage the amount of light reflected from the bill at other randomly selected areas, said photocells being actuated by the reference voltage level established by the feedback circuit, a separate zener diode circuit having a constant voltage impressed thereacross electrically connected with each respective test photocell, said zener diode circuit comprising a pair of zener diodes having determined voltage limits positioned in series in opposite phase across the constant voltage impressed on the cuit so that the voltage measured by the respective test photocell is impressed on the common point between the series connected zener diodes, and a load to receive currents transmitted by the zener diode circuit upon the cascaded unloading of one of the zener diodes when the voltage thereacross has exceeded the determined voltage limit.

10. In a circuit for authentication of paper securities the combination of means to project light onto a paper security to be tested, a reference photocell to view the light from a particular area of the paper security to be tested, circuit means connected to the reference photocell to produce an output voltage dependent upon the amount of light detected by the reference photocell, a plurality of test photocells to view the light from other areas of the paper security to be tested wherein the output voltage from the circuit means establishes a reference between the amount of light put out by the means to project light, and a separate zener diode circuit impressed with a constant input voltage electrically connected with each test photocell comprising a pair of zener diodes having determined voltage limits positioned in series and opposite phase across the constant voltage impressed on the zener diode circuit so that the voltage measured by the respective test photocell is impressed on the common point between the series connected zener diodes, and means to sense whether all the test photocells have voltage outputs falling within the voltage limits of the zener diodes to determine if the paper security tested is authentic.

11. In an electrical circuit for authentication of a paper security the combination of means to project light onto the security, a reference photocell to measure in a voltage the amount of light passed through a relatively clear portion of the security, a feedback circuit actuated by the voltage measurement from the reference photocell to establish a reference voltage level, a plurality of test photocells to measure in a voltage the amount of light passed though the bill at other randomly selected areas, the relationship of the amount of light detected and the voltage output of the photocells being directly controlled by the reference voltage level established by the feedback circuit, a separate zener diode circuit having a constant voltage impressed thereacross being electrically connected with each respective test photocell, said zener diode circuit comprising zener diodes arranged to establish a predetermined voltage pass band for measuring the voltages received from the test photocells to determine whether such voltages fall within the predetermined voltage pass band, and means to direct the voltage output from the test photocells to the zener diodes in the zener diode circuit to determine whether they fall within the predetermined voltage pass band.

References Cited

UNITED STATES PATENTS

| | | | |
|---|---|---|---|
| 2,936,886 | 5/1960 | Harmon | 250—208 |
| 3,086,121 | 4/1963 | Cockrell | 250—209 |
| 3,304,432 | 2/1967 | Leingarg | 250—219 |

ARCHIE R. BORCHELT, *Primary Examiner.*

RALPH G. NILSON, *Examiner.*

J. D. WALL, *Assistant Examiner.*